US010525782B2

(12) United States Patent
Derr et al.

(10) Patent No.: US 10,525,782 B2
(45) Date of Patent: Jan. 7, 2020

(54) COMPOSITE PART AND AIR SPRING COMPONENT CONTAINING SUCH A COMPOSITE PART

(71) Applicant: Vibracoustic GmbH, Darmstadt (DE)

(72) Inventors: Sergej Derr, Winsen (DE); Joerg Hechenblaikner, Salzhausen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 55 days.

(21) Appl. No.: 15/541,717

(22) PCT Filed: Nov. 18, 2015

(86) PCT No.: PCT/EP2015/076984
§ 371 (c)(1),
(2) Date: Jul. 6, 2017

(87) PCT Pub. No.: WO2016/110357
PCT Pub. Date: Jul. 14, 2016

(65) Prior Publication Data
US 2018/0015800 A1    Jan. 18, 2018

(30) Foreign Application Priority Data
Jan. 9, 2015 (DE) .................. 10 2015 100 281

(51) Int. Cl.
*B60G 11/28* (2006.01)
*F16F 9/05* (2006.01)

(52) U.S. Cl.
CPC .............. *B60G 11/28* (2013.01); *F16F 9/057* (2013.01); *B60G 2204/126* (2013.01);
(Continued)

(58) Field of Classification Search
CPC ...... B60G 2206/424; B60G 2206/7102; B60G 2206/7104; B60G 2206/81012; B60G 2206/82013; B60G 11/27; B60G 11/28; B60G 13/10; B60G 15/12; B60G 2204/126; B60G 2204/1262; B60G 2202/152; B60G 2202/242; F16F 9/04; F16F 9/0409;
(Continued)

(56) References Cited

U.S. PATENT DOCUMENTS 4,104,089 A * 8/1978 Miki .................. C22C 21/02
148/415
4,796,870 A * 1/1989 Hoffman ............ B60G 15/14
267/35
(Continued)

FOREIGN PATENT DOCUMENTS

DE      20210955 U1    10/2002
DE      10347934 A1     6/2004
(Continued)

*Primary Examiner* — Laura Freedman
(74) *Attorney, Agent, or Firm* — Leydig, Voit & Mayer, Ltd.

(57) ABSTRACT

A composite part for an air spring component of a motor vehicle includes a first element made of a first material and a second element made of a second material. The second element at least partially surrounds the first element. In the air spring component, the composite part can be bonded to at least one second component in an adhesive-bonded manner.

10 Claims, 8 Drawing Sheets

(52) U.S. Cl.
CPC ............... *B60G 2206/7102* (2013.01); *B60G 2206/7104* (2013.01); *B60G 2206/81012* (2013.01)

(58) Field of Classification Search
CPC .......... F16F 9/0436; F16F 9/0454; F16F 9/05; F16F 9/057
See application file for complete search history.

(56) References Cited

U.S. PATENT DOCUMENTS

| | | | | |
|---|---|---|---|---|
| 4,988,082 | A * | 1/1991 | Pees | B29D 22/02 |
| | | | | 267/122 |
| 5,005,808 | A | 4/1991 | Warmuth, II et al. | |
| 5,752,692 | A | 5/1998 | Crabtree et al. | |
| 6,199,837 | B1 * | 3/2001 | Leonard | B60G 11/28 |
| | | | | 267/122 |
| 6,386,524 | B1 * | 5/2002 | Levy | B60G 11/28 |
| | | | | 267/64.21 |
| 6,843,472 | B2 * | 1/2005 | Henry, III | B60G 13/006 |
| | | | | 267/64.24 |
| 7,758,057 | B2 * | 7/2010 | Mauz | B60G 3/20 |
| | | | | 280/124.145 |
| 8,376,327 | B2 * | 2/2013 | Lee | B60G 15/10 |
| | | | | 267/113 |
| 9,140,327 | B2 * | 9/2015 | Hart | B60G 11/28 |
| 9,327,573 | B2 * | 5/2016 | Weber | B60G 7/001 |
| 9,630,471 | B2 * | 4/2017 | Kato | F16F 9/38 |
| 2007/0084553 | A1 | 4/2007 | Nakajima et al. | |
| 2007/0096374 | A1 | 5/2007 | Scholz | |
| 2010/0127438 | A1 | 5/2010 | Eise et al. | |
| 2010/0237549 | A1 | 9/2010 | Jeischik | |
| 2011/0115139 | A1 | 5/2011 | Moulik et al. | |
| 2012/0153550 | A1 | 6/2012 | Sigirtmac et al. | |
| 2012/0291626 | A1 | 11/2012 | Westnedge et al. | |
| 2014/0054833 | A1 | 2/2014 | Neitzel et al. | |
| 2016/0305504 | A1 | 10/2016 | Hechenblaikner et al. | |

FOREIGN PATENT DOCUMENTS

| | | |
|---|---|---|
| DE | 10315679 A1 | 10/2004 |
| DE | 102004030335 A1 | 1/2006 |
| DE | 102004060727 A1 | 7/2006 |
| DE | 102006043471 A1 | 3/2008 |
| DE | 102007035640 A1 | 1/2009 |
| DE | 102011050103 A1 | 11/2012 |
| DE | 102012012902 A1 | 1/2013 |
| DE | 102012015032 A1 | 2/2014 |
| DE | 102013212982 A1 | 6/2014 |
| EP | 1691105 A2 | 8/2006 |
| EP | 2031268 A1 | 3/2009 |
| EP | 1862335 B1 | 4/2010 |
| JP | H 09382 U | 6/1997 |
| JP | H 10196700 A | 7/1998 |
| JP | 2004316468 A | 11/2004 |
| JP | 2002364469 A | 5/2007 |
| JP | 2007111926 A | 5/2007 |
| JP | 2009127682 A | 6/2009 |
| JP | 2010090989 A | 4/2010 |
| JP | 2010281433 A | 12/2010 |
| WO | WO 0161207 A1 | 8/2001 |
| WO | WO 2008015034 A1 | 2/2008 |
| WO | WO 2015086315 A1 | 6/2015 |

* cited by examiner

FIG 6
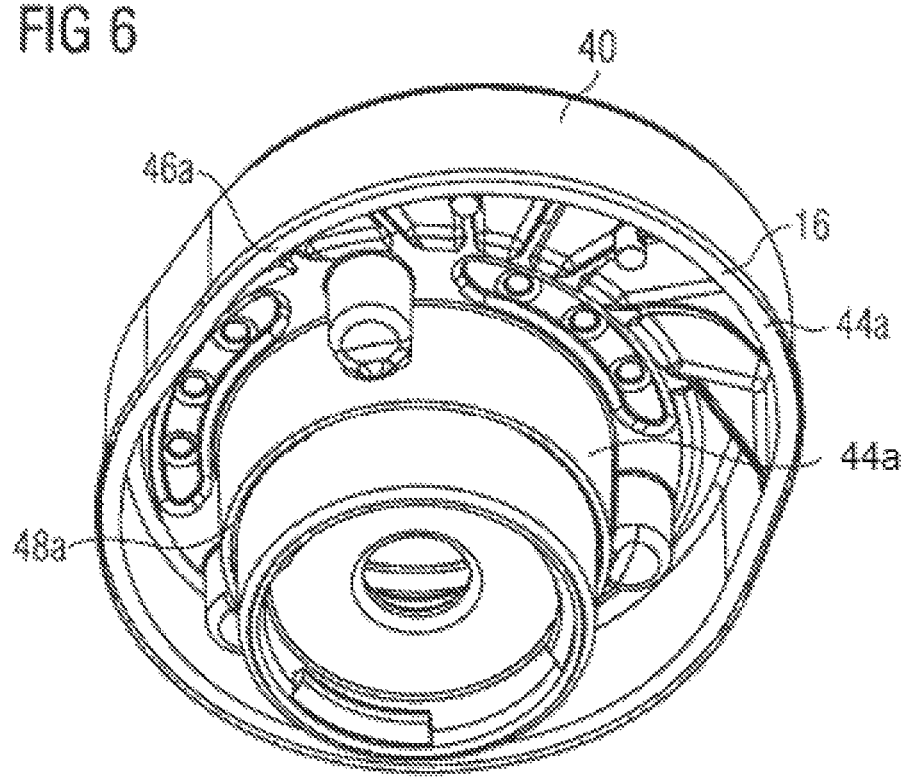
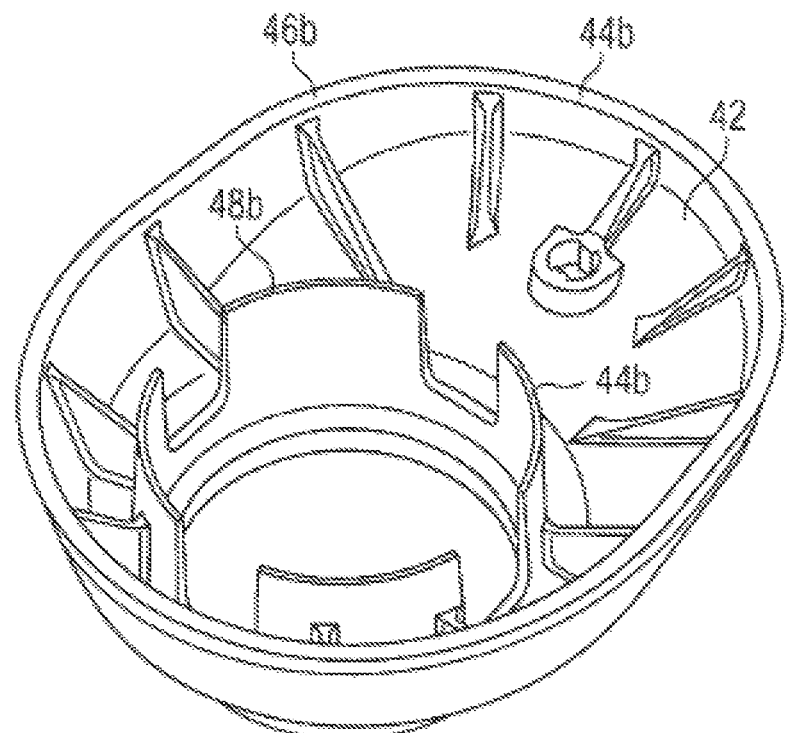

FIG 9
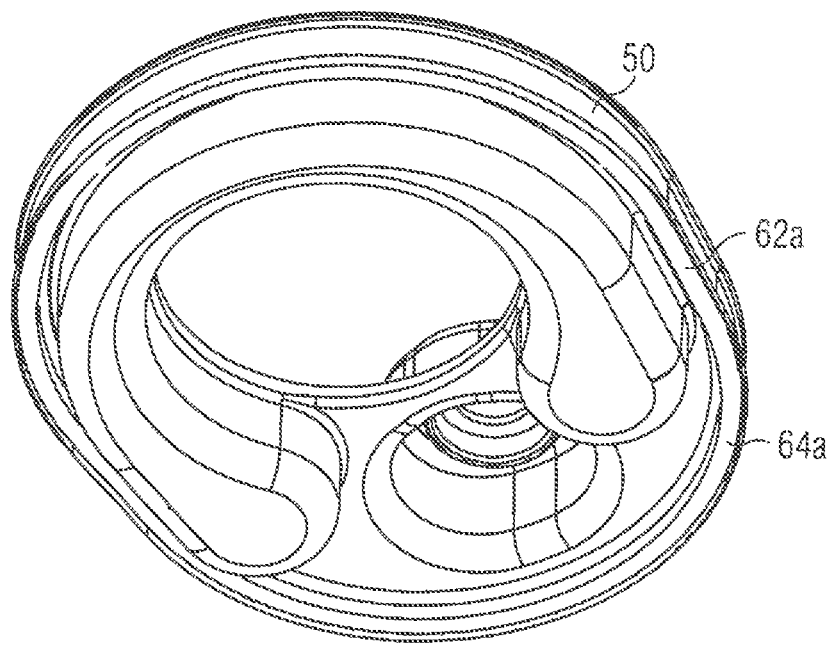
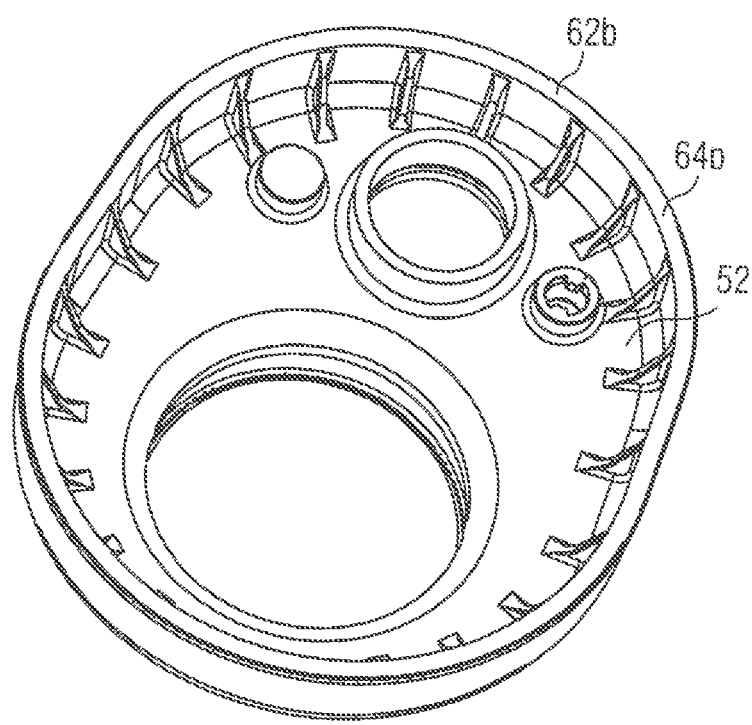

COMPOSITE PART AND AIR SPRING COMPONENT CONTAINING SUCH A COMPOSITE PART

CROSS-REFERENCE TO PRIOR APPLICATIONS

This application is a U.S. National Stage Application under 35 U.S.C. § 371 of International Application No. PCT/EP2015/076984 filed on Nov. 18, 2015, and claims benefit to German Patent Application No. DE 10 2015 100 281.7 filed on Jan. 9, 2015. The International Application was published in German on Jul. 14, 2016 as WO 2016/110357 A1 under PCT Article 21(2).

FIELD

The present invention relates to a composite part for an air spring component of a motor vehicle, in particular for an air spring pot of an air spring strut of a motor vehicle. Further, the invention relates to an air spring component having such a composite part.

BACKGROUND

Air springs are used to cushion two vehicle components that can move relative to one another, but also to modify the level of a vehicle. Air springs have an air-filled air spring bellows made of rubber, which is closed in an airtight manner by means of an upper closure element and a rolling piston. The closure element and the rolling piston are also referred to as air spring components. Attachment of the air spring to a motor vehicle part, such as the vehicle body and/or the chassis, is achieved via the air spring components. The air spring component can thereby be composed of a plurality of components bonded to each other.

In addition, air springs are applied in combination with a vibration damper in air spring struts. Thereby, the air spring takes over the function of a spring and the vibration damper takes over the function of a damper. Vibration dampers are mostly used as telescopic shock absorbers having an oil-filled cylinder, wherein the piston rod moves into the cylinder and is damped by the oil. At the end the air spring is positioned on the vibration damper and is connected to the piston rod. The upper closure element of the air spring is formed thereby as an air spring pot having a connector to connect a compressor. The connection to a vehicle component is achieved via the air spring pot.

Thus, air spring components and their constituents must have a sufficient strength for power transfer and simultaneously a sufficient tightness at the same time.

SUMMARY

In an embodiment, the present invention provides a composite part for an air spring component of a motor vehicle including a first element made of a first material and a second element made of a second material. The second element at least partially surrounds the first element. In the air spring component, the composite part can be bonded to at least one second component in an adhesive-bonded manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 is a perspective illustration of the parts of the air spring component shown in FIG. 5 with their joining areas;

FIG. 9 is a perspective illustration of the middle part and bottom part shown in FIG. 5, with their joining areas;

DETAILED DESCRIPTION

Figure 1:
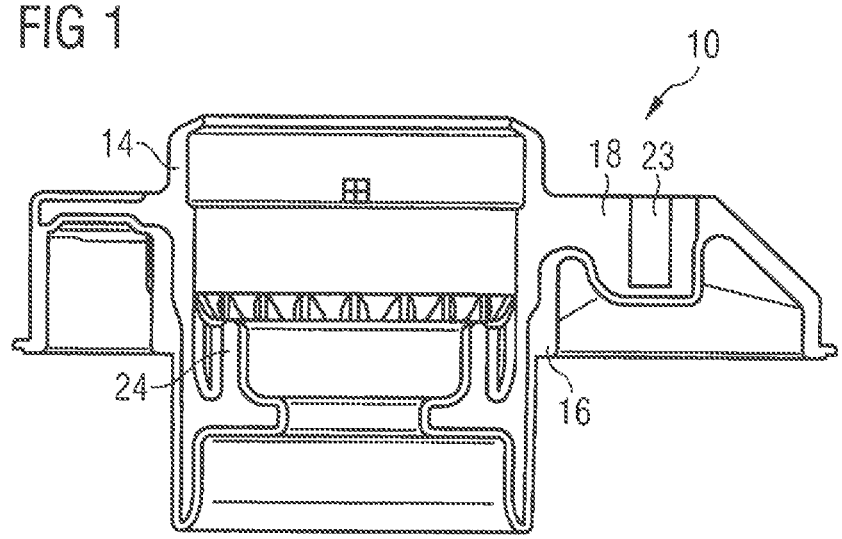
FIG. 1 is a longitudinal section through a composite part according to a first embodiment of an air spring component formed as an air spring pot.

In an embodiment, the invention provides a composite part for an air spring component and an air spring component having both improved strength for power transmission and simultaneously improved tightness.

According to an embodiment, the composite part of an air spring component of a motor vehicle, in particular for an air spring pot of an air spring strut of a motor vehicle, comprises a first element made of a first material and a second element made of a second material, wherein the second element surrounds the first element at least on partially. The first element made of a first material has sufficient strength and thus serves for attachment on and power transmission onto a vehicle component, such as the vehicle body or chassis. The second element made of a second material and surrounding the first element at least on partially ensures sufficient tightness, particularly gas leak tightness of the composite part, so that the composite part is suitable for air spring applications. The composite part may also be referred to as a hybrid part. Preferably, the composite part can be connected to other components to form an air spring component, in particular an air spring pot. The first element may be formed in one piece or in several pieces.

In an advantageous embodiment, the second element is connected to the first element in an adhesive-bonded and/or form-fit manner. Preferably, the second element is connected to the first element by injection molding on partially and/or completely around the first element. For this purpose the first element may be inserted into an injection mold and can be injection molded on partially and/or completely with the second element, so that the second element is connected to the first element in an adhesive-bonded manner. Further, the second element may be manufactured as a separate component and may be connected to the first element in a power-locking, form-fit and/or adhesive-bonding manner. Thus, the second element can be pressed onto and/or welded to the first element.

Further advantageously, the second element is formed as a coating and/or a closure element. A coating formed as a second element is mostly applied by means of injection molding onto the first element or is connected thereto. Further, a second element formed as a coating may be applied as a painting onto the first element. Formed as a closure element, the second element is preferably manufactured by injection molding by inserting the first element into an injection mold and injection molding around it with the second element, thereby forming the closure element using the second element. Hereby, the second element takes over the function of a cover element to close up an air spring pot.

The second element may comprise at least one joining area for attachment to a second component. A second component, such as a bottom part, a middle part and/or an intermediate part to form an air spring component, in particular an air spring pot, is connected to the composite part via the joining area. Advantageously, the composite part is connected to the second component in an adhesive-bonded manner. Further advantageously, the composite part is welded to the second component. Welding is advantageously carried out in an inert atmosphere. For this purpose, the joining areas of the composite part and the second component are first heated in an inert atmosphere and then pressed together.

In an advantageous embodiment the joining area has at least one fusible projection. The joining areas may be manufactured directly during injection molding with the second element around the first element. Furthermore, the joining areas can be flat, but they can also have a three-dimensional configuration. The fusible projections are heated and/or plasticized or fused either by means of hot gas, infrared radiation, mirror heating and/or induction and then form a weld seam through pressure and solidification with another heated and/or plasticized joining area.

The joining area advantageously consists of at least one edge portion, a projection, a rib and/or a web of the second element and/or of the first element. Preferably, the joining area consists of several edge portions, projections, ribs and/or webs. The ribs and/or webs ensure sufficient stability and stiffness of the composite part. Further advantageously, the ribs and/or webs project radially inwardly and/or outwardly from a housing wall. Thereby, the part can be formed, such that the joining area and the connection point are both arranged on the outer circumference and on the inner circumference of the part. The webs and/or ribs may have an approximately T-shaped basic shape. It is thereby possible to enlarge the surface area of the joining areas.

In an advantageous embodiment, the first element is designed as a flange for attachment to a motor vehicle part. The power is transmitted to a motor vehicle part via the flange.

Further advantageously, the first element has a receiving portion for receiving an insert to guide a damper rod of a vibration damper. Advantageously, the insert comprises a flange, which may be press-fitted into the receiving portion, a guide element guiding the damper rod, and a diaphragm connecting the flange and the guide portion with each other. The second element is advantageously placed for sealing purpose into the receiving portion. Further advantageously, the second element is arranged between the first element and the insert being press-fitted into the receiving portion.

The first material may comprise metal, especially aluminum die cast. A flange formed from die cast aluminum has sufficient strength for power transmission. Furthermore, the first material may also be steel. The first element may be a deep-drawn part or a turned part.

In an advantageous embodiment, the second material is a thermoplastic, in particular an injectable thermoplastic. The thermoplastic ensures a sufficient tightness of a first element manufactured from a metal, in particular die-cast aluminum. Preferably, PA 66 GF 30 is used as thermoplastic.

The invention further relates to an air spring component having such a composite part and at least one second component, connected with each other in an adhesive-bonded manner. Thereby, an air spring component, in particular an air spring pot for an air spring of an air suspension strut of a motor vehicle is provided, which has a sufficient tightness and simultaneously a sufficient stiffness for power transmission to a vehicle component. An air suspension strut preferably comprises an air spring and a vibration damper. The air spring thereby takes over the function of a spring and the vibration damper takes over the function of a damper. Telescopic vibration dampers are mostly used as vibration dampers having an oil-filled cylinder, wherein a piston rod moves into the cylinder and is damped by the oil. At the end the air spring is positioned on the vibration damper and is connected to the piston rod. The connection to a vehicle component is achieved via the air spring, in particular via the air spring pot.

In an advantageous embodiment, the adhesive bond is created by heating and/or fusing and subsequent pressing together of the joining areas of the parts in an inert atmosphere. The adhesive bond of the two components in an inert atmosphere allows for a pressure-retaining air spring component having a sufficient tightness, strength and temperature stability and aging resistance in the portion of the connection areas or joining areas. Further, the adhesive bond in an inert atmosphere ensures a great freedom of design of the joining areas or the connection areas. The joining areas can be arranged both on the outer periphery, especially at the edge portions of the part and in the interior of the part. Furthermore, the joining areas may be flat, but may also have a three-dimensional configuration. In addition, advantageously no post-processing of the joining areas is required. Furthermore, the inert atmosphere protects the joining areas from contamination, since an oxidation and/or a reaction of the areas to be joined is prevented. Thereby, the weld seam has a high strength and tightness.

In a preferred embodiment, heating is accomplished by means of hot gas, infrared radiation, mirror heating and/or induction. Advantageously, the heating is carried out either in vacuum or using an inert working gas, in particular nitrogen, in a corresponding enclosure.

In an advantageous embodiment, at least one of the parts has a weld seam covering that covers a joining gap. Further advantageously, the weld seam covering protrudes from the composite part and/or the second component and is located in a corresponding recess of the composite part and/or of the second component.

The weld seam covering is advantageously formed as a circumferential covering lip. Here, the covering lip protrudes from one of the parts, preferably from the housing wall thereof. During the pressing together of the two parts, the covering lip makes contact with the other part or the housing wall thereof and, as a result, covers the joining gap. Thus, the covering lip prevents the plasticized or fused joining areas from escaping during the pressing operation. As a result, it is no longer necessary to finish machine the weld seam in an expensive process since a clean outer surface of the air spring component is created. Further advantageously, the weld seam covering is configured as a covering lip that tapers to a point and engages in a corresponding bevel on the opposite part during the pressing operation. A very largely smooth outer surface is thereby advantageously created.

In an advantageous embodiment, the composite part is formed as a top part and is connected to a bottom part in an adhesive-bonded manner to form an air spring pot. Further advantageously, a middle part is arranged between the top part and the bottom part and is connected with the top part and the bottom part in an adhesive-bonded manner to form an air spring pot. Thereby, a switchable air spring may be realized. Advantageously, the bottom part and/or the middle part are made of metal or thermoplastic, in particular a glass fiber-reinforced thermoplastic. PA66 GF30 is preferably used as thermoplastic. The parts made of plastic contribute to a reduction in weight and, consequently, to fuel savings. Aluminum which also has a comparatively low weight is preferably used as metal.

Subsequently, the composite part and the air spring component will be explained with reference to the accompanying schematic figures.

Figure 2:
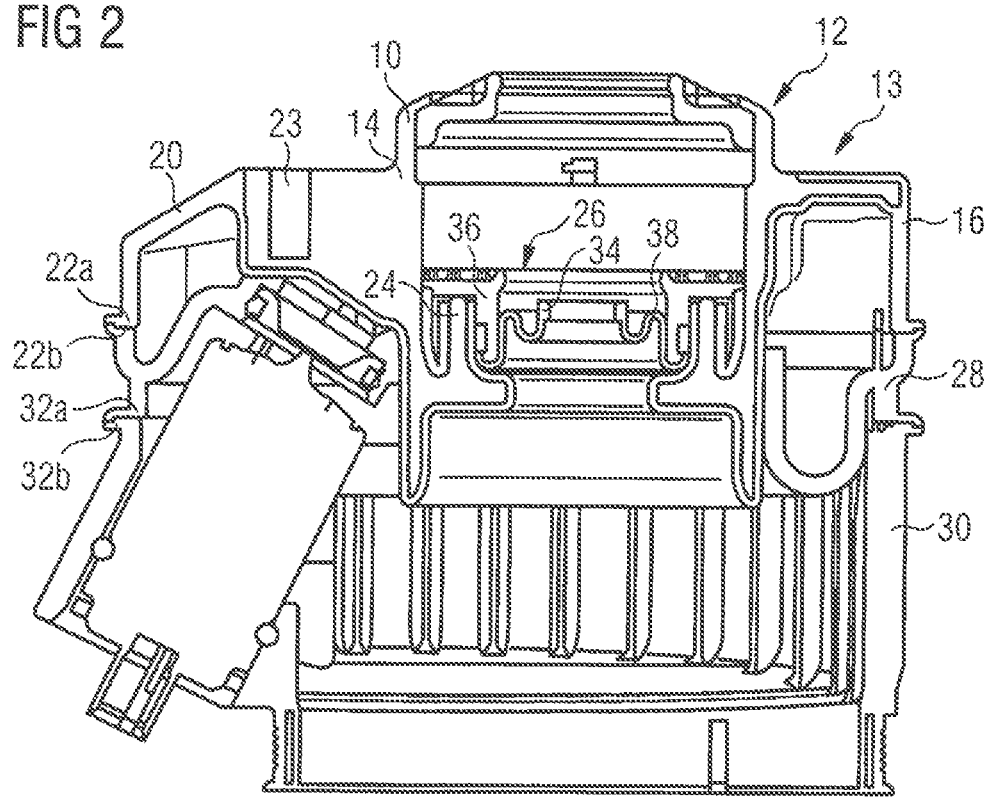
FIG. 2 is a longitudinal section through an air spring component formed as an air spring pot according to a first embodiment, with the composite part shown in FIG. 1.

In FIG. 1, a composite part 10 according to a first embodiment is shown in a longitudinal section, being used in an air spring component 12 shown in FIG. 2. The air spring component 12 is formed as an air spring pot 13 for an air spring of an air spring strut of a motor vehicle.

The composite part 10 being also referred to as a hybrid part has a first element 14 made of a first material and a second element 16 made of a second material.

The first element 14 is a flange 18 configured for attachment to a motor vehicle part and is made of a metal, in particular die-cast aluminum. Furthermore, the first element 14 has an attachment portion 23 for attachment to a motor vehicle part and a receiving portion 24 for receiving an insert 26, shown in FIG. 2.

The second element 16 is formed as a coating 20 surrounding the first element 14 on partially. The second element 16 is made of a thermoplastic, such as PA 66 GF 30. The coating 20 is connected to the flange 18 in an adhesive-bonded manner. For this purpose, the flange 18 is inserted into an injection mold and is injection molded with a thermoplastic. The coating 20 ensures a sufficient tightness of the flange 18, so that the composite part 10 is suitable for an air spring application. Further, the second element 16 has a joining area 22 $a$ for attachment to a second component. The joining area 22 $a$ is formed during the injection molding around the first element 14 with the second element 16 and may be flat or may have a three-dimensional configuration.

The air spring component 12 illustrated in FIG. 2 has the composite part 10, a middle part 28 and a bottom part 30, which are connected to the air spring pot 13 in an adhesive-bonded manner. The middle part 28 and the bottom part 30 are made of a plastic, especially a thermoplastic, such as PA 66 GF 30. The middle part 28 has a joining area 22 $b$ corresponding to the joining area 22 $a$ of the second element 16. Further, the middle part 28 has another joining area 32 $a$ connected to a corresponding joining area 32 $b$ of the bottom part 30. The adhesive-bonded connection of the parts 10, 28, 30 with the air spring component 12 is achieved via the joining areas 22 $a$, 22 $b$, 32 $a$, 32 $b$. Thus, the parts 10, 28, 30 are bonded to each other by means of hot gas welding, by heating and/or fusing or plasticizing and subsequently pressing together the joining areas 22 $a$ with 22 $b$, and 32 $a$ with 32 $b$. After solidification of the joining areas 22 $a$, 22 $b$, 32 $a$, 32 $b$, the parts 10, 28, 30 are connected to each other in an adhesive-bonded manner by forming a weld seam. In hot gas welding, the joining areas 22 $a$, 22 $b$, 32 $a$, 32 $b$ are heated and/or fused or plasticized by means of a hot gas, whereby nitrogen is preferably used as the working gas.

Further, the insert 26 is press-fitted into the receiving portion 24. The receiving portion 24 is provided with the coating 20 to ensure adequate tightness. The insert 26 comprises a guide element 34 for guiding a damper rod a flange element 36 for press-fitting into the receiving portion 24, and a diaphragm 38 connecting together the guide element 34 and the flange element 36.

Figure 3:
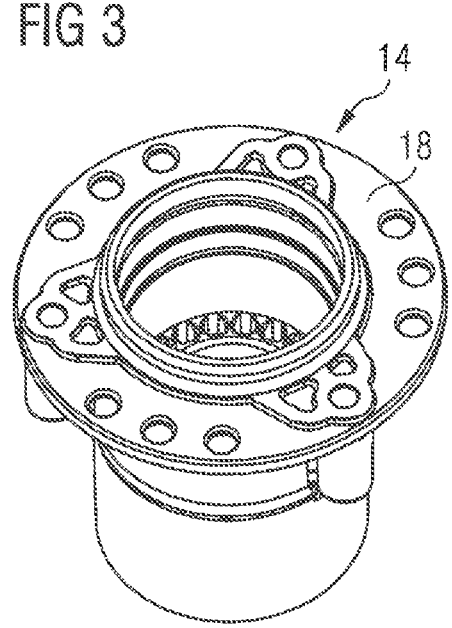
FIG. 3 is a perspective illustration of a first element for a composite part.
Figure 4:
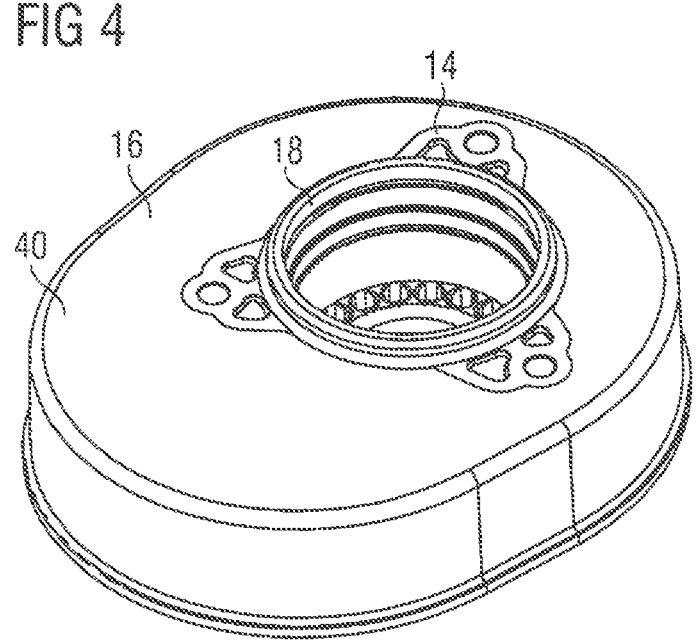
FIG. 4 is a perspective illustration of a composite part according to a second embodiment, with the first element shown in FIG. 3.

A second embodiment of a first element 14 formed as a flange 18 from die-cast aluminum is presented in FIG. 3, which is used as a composite part 10 shown in FIG. 4, according to a second embodiment. The second embodiment of the composite part 10 differs from the first embodiment in the configuration of the second element 16. The second element 16 is formed as a top part 40 for an air spring pot 13 and is connected to the flange 18 in an adhesive-bonded manner. For this purpose, the flange 18 is inserted into an injection mold and is injection molded with a plastic to form the top part 40.

Figure 5:
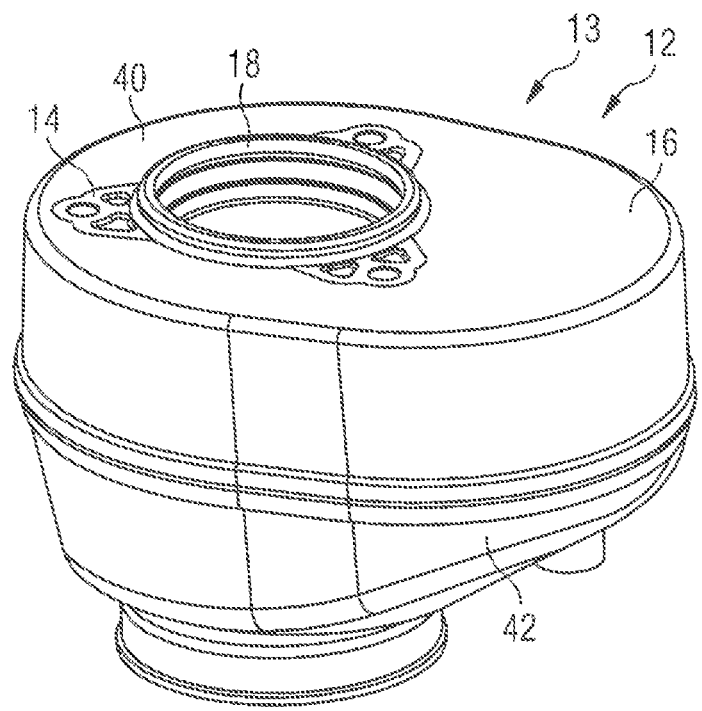
FIG. 5 is a perspective illustration of the individual parts of an air spring component formed as an air spring pot according to a second embodiment, with the composite part shown in FIG. 4.

In FIG. 5 an air spring component 12 according to a second embodiment is shown having the composite part 10 and a bottom part 42 shown in FIG. 4. The composite part 10 and the bottom part 42 are connected to each other in an adhesive-bonded manner. As is shown in FIG. 6, the composite part 10 has a first joining area 44$a$, and the bottom part 42 has a second joining area 44$b$ corresponding thereto. Both joining areas 44$a$, 44$b$ are formed from an edge portion 46$a$, 46$b$ and a circular portion 48$a$, 48$b$. The joining areas 44$a$, 44$b$ are connected to each other by hot gas welding in an adhesive-bonded manner.

Figure 7:
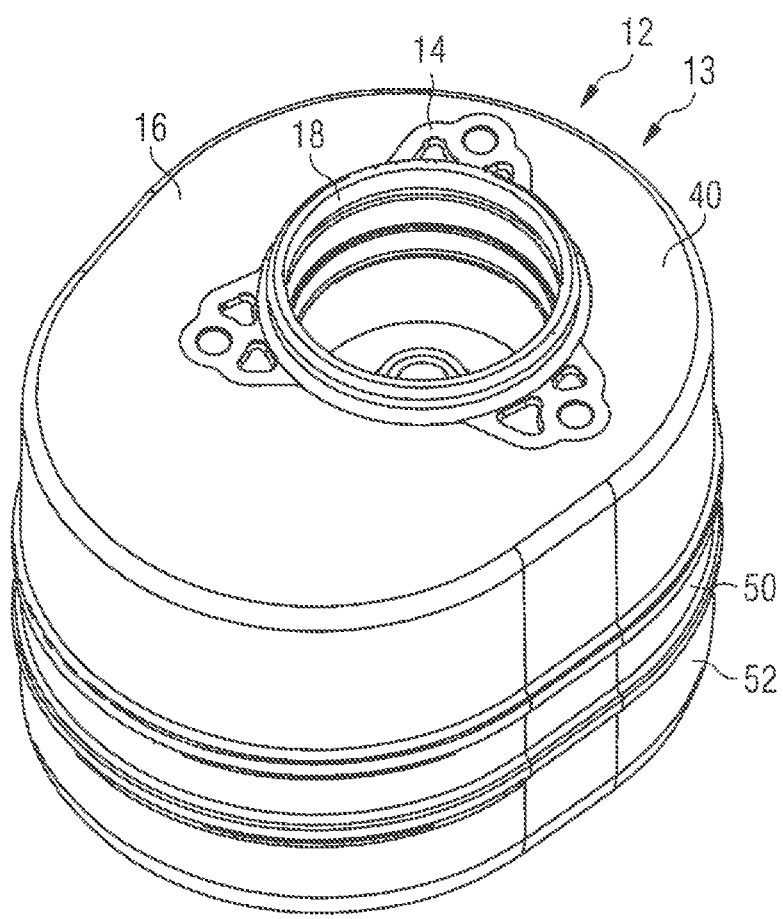
FIG. 7 is a perspective illustration of the individual parts of an air spring component formed as an air spring pot component according to a third embodiment, with the composite part shown in FIG. 4.

A third embodiment of an air spring component 12 formed as an air spring pot 13 is shown in FIG. 7. The air spring component 12 includes the composite part 10, a middle part 50 and a bottom part 52 shown in FIG. 4, connected to each other in an adhesive-bonded manner.

Figure 8:
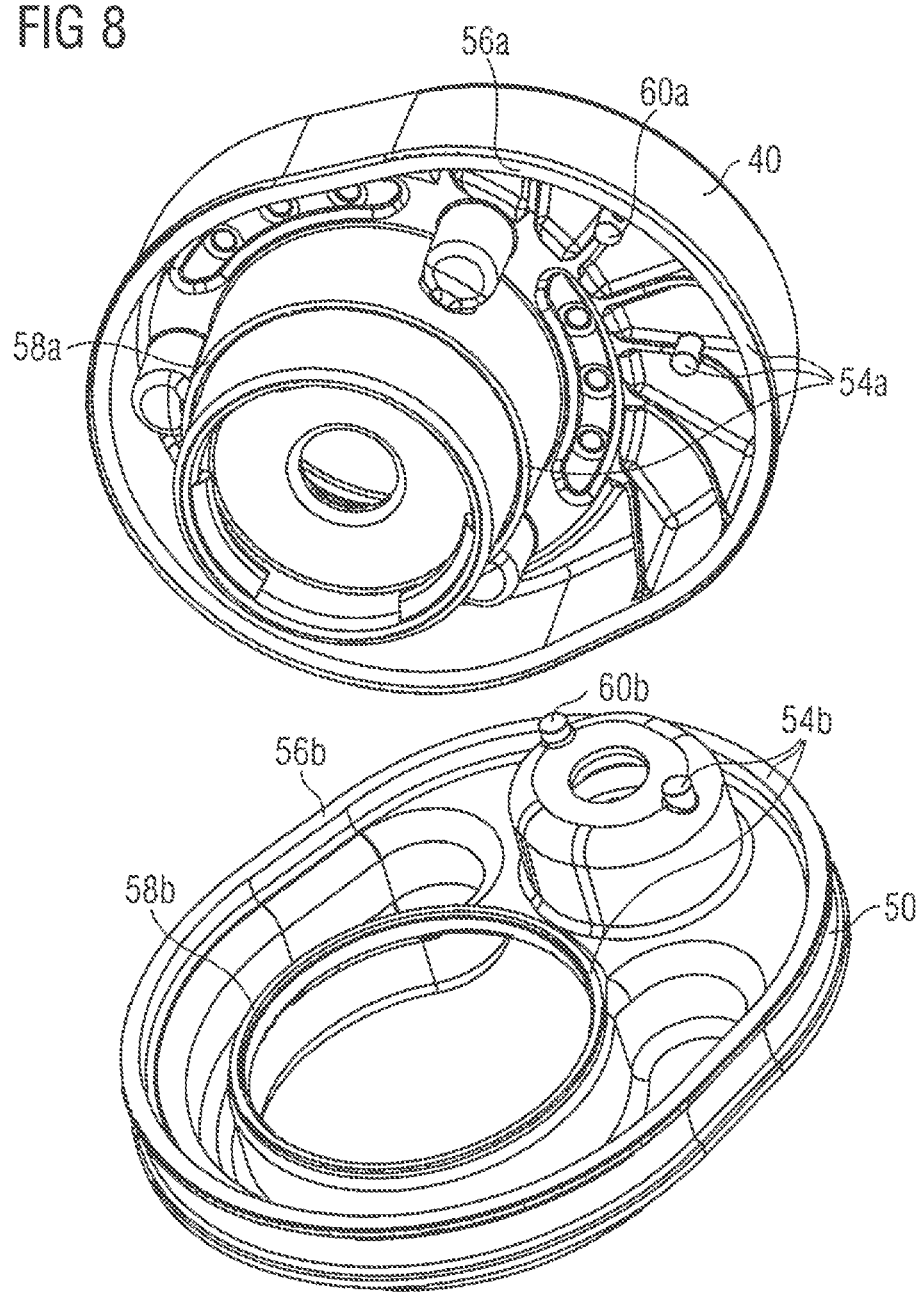
FIG. 8 is a perspective illustration of the composite part and middle part shown in FIG. 5, with their joining areas.

As is shown in FIG. 8, the composite part 10 has a joining area 54 $a$, and the middle part 50 has a joining area 54 $b$ corresponding thereto, each being formed from an edge portion 56 $a$, 56 $b$, a circular portion 58 $a$, 58 $b$, and projections 60 $a$, 60 $b$. As is shown in FIG. 9, the middle part 50 further has another joining area 62 $a$ and the bottom part 52 has a joining area 62 $b$ corresponding thereto, which are formed from the edge portions 64 $a$, 64 $b$.

Figure 10:
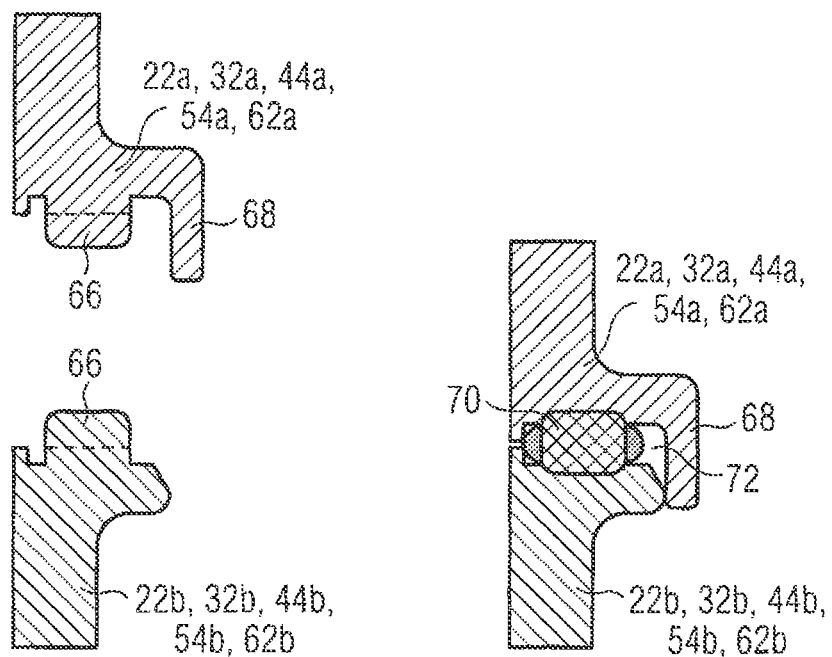
FIG. 10 is an enlarged sectional view of a longitudinal section through a joining area according to a first embodiment.

An enlarged sectional view of a longitudinal section through a first embodiment of the joining areas 22$a$, 22$b$, 32$a$, 32$b$, 44$a$, 44$b$, 54$a$, 54$b$, 62$a$, 62$b$ in the region of the edge portions 46$a$, 46$b$, 56$a$, 56$b$ is shown in FIG. 10. The joining areas 22$a$, 22$b$, 32$a$, 32$b$, 44$a$, 44$b$, 54$a$, 54$b$, 62$a$, 62$b$ each have a fusible projection 66 (left illustration of FIG. 10). Further, a weld seam covering 68 projects from one of the joining areas 22$a$, 22$b$, 32$a$, 32$b$, 44$a$, 44$b$, 54$a$, 54$b$, 62$a$, 62$b$. The fusible projections 66 are heated by hot gas, infrared, mirror heating and/or induction and/or are melted or plasticized and pressed together, so to create a weld seam 70 (right illustration of FIG. 10). During the pressing together, the weld seam covering 68 makes contact with the other component and, as a result, covers a joining gap 72. Thereby, no melt can leak, so that a clean outer surface is created.

Figure 11:
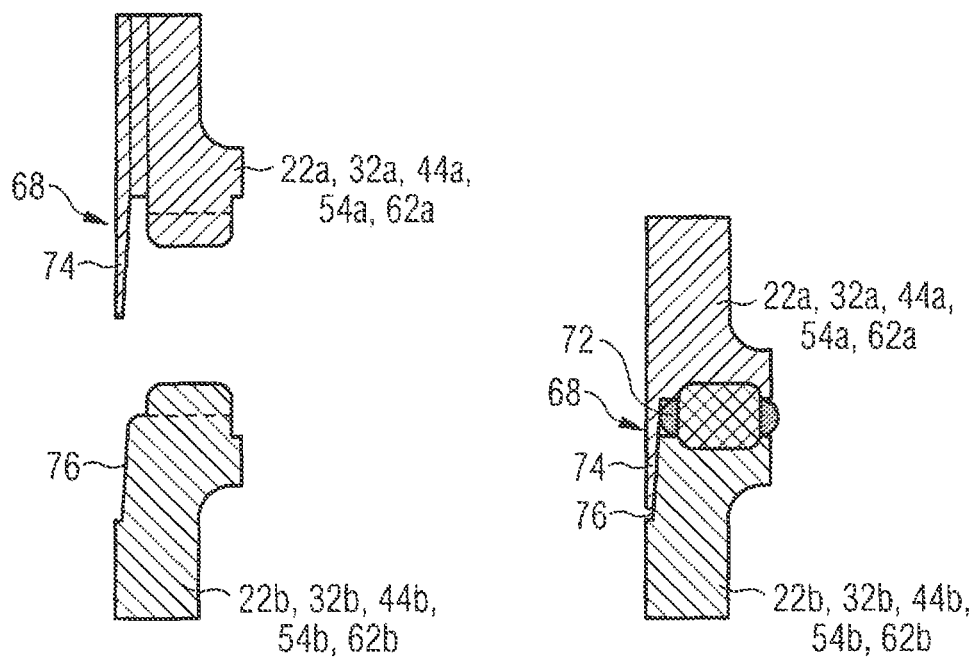
FIG. 11 is an enlarged sectional view of a longitudinal section through a joining area according to a second embodiment.

An enlarged sectional view of a longitudinal section according to a second embodiment of the joint areas 22a, 22b, 32a, 32b, 44a, 44b, 54a, 54b, 62a, 62b is shown in FIG. 11, which differs from the first embodiment in that the weld seam covering 68 is formed as a tapered covering lip 74 (left view of FIG. 11), which after pressing together engages with a bevel 76 of a second component, so to cover the joint gap 72. Thereby, a smooth surface is created toward the outside.

The composite part 10 is characterized by its combination of a flange 18 made of die-cast aluminum and a second element 16 made of a thermoplastic and surrounding the flange 18 at least on partially. The attachment and transmission of power to a motor vehicle part is carried out via the flange 18 and the second element 16 ensures sufficient tightness of the flange 18 made of die-cast aluminum. As a result, the composite part 10 can be used in an air spring component, such as an air spring pot 13 of an air spring strut. Further, the second element 16 has joining geometries for connecting the composite part 10 with additional components 28, 30, 42, 50, 52 to form an air spring pot 13 in an adhesive-bonded manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 composite part
12 air spring component
13 air spring pot
14 first element
16 second element
18 flange
20 coating
22a joining area
22b joining area
23 attachment portion
24 receiving portion
26 insert
28 middle part
30 bottom part
32a joining area
32b joining area
34 guiding element
36 flange element
38 diaphragm
40 top part
42 bottom part
44a joining area
44b joining area
46a edge portion
46b edge portion
48a circular portion
48b circular portion
50 middle part
52 bottom part
54a joining area
54b joining area
56a edge portion
56b edge portion
58a circular portion
58b circular portion
60a projection
60b projection
62a joining area
62b joining area
64a edge portion
64b edge portion
66 projection
68 weld seam covering
70 weld seam
72 joint gap
74 covering lip
76 bevel

The invention claimed is:

1. A composite part for an air spring component of a motor vehicle, the motor vehicle having a motor vehicle part, the composite part comprising:
   a first element comprising a flange attachable to the motor vehicle part, the first element comprising a first material, the first material comprising die cast aluminum;
   a second element comprising a second material, the second material comprising a thermoplastic; and
   at least one weld seam covering,
   wherein the second element circumferentially surrounds an outer perimeter of the flange of the first element at least partially so as to provide gas leak tightness of the composite part,
   wherein the second element has at least one joining area to connect with a second component comprising the thermoplastic,
   wherein the joining area has at least one fusible projection, and
   wherein the at least one weld seam covering is spaced from the at least one fusible projection and configured to contact a corresponding portion of the second component.

2. The composite part according to claim 1, wherein the second element is connected to the first element in at least one of an adhesive-bonded manner and a form-fit manner.

3. The composite part according to claim 1, wherein the second element is formed as at least one of a coating and a closure element.

4. The composite part according to claim 1, wherein the joining area is formed from at least one of an edge portion, a projection, a rib and a web.

5. The composite part according to claim 1, wherein the first element has a receiving portion configured to receive an insert to guide a damper rod of a vibration damper.

6. The composite part according to claim 1, wherein the second material comprises an injectable thermoplastic.

7. An air spring component, comprising:
a composite part, comprising:
   a first element comprising a flange attachable to a motor vehicle part, the first element comprising a first material, the first material comprising die cast aluminum; and
   a second element comprising a second material, wherein the second material comprises a thermoplastic, and wherein the second element circumferentially surrounds an outer perimeter of the flange of the first element at least partially so as to provide gas leak tightness of the composite part; and at least one second component connected to the composite part in an adhesive-bonded manner, the at least one second component comprising the thermoplastic,
wherein at least one of the composite part and the at least one second component has a weld seam covering which covers a joint gap.

8. The air spring component according to claim 7, wherein an adhesive bond is formed from at least one of heating and fusing and subsequently pressing together joining areas of the composite part and the at least one second component in an inert atmosphere.

9. The air spring component according to claim 7, wherein the composite part is formed as a top part and is connected to a bottom part in an adhesive-bonded manner to form an air spring pot.

10. The air spring component according to claim 9, wherein a middle part connecting the top part and the bottom part in an adhesive-bonded manner to form the air spring pot is arranged between the top part and the bottom part.

* * * * *